(12) United States Patent
Aguilar et al.

(10) Patent No.: US 6,463,531 B1
(45) Date of Patent: Oct. 8, 2002

(54) METHOD AND SYSTEM FOR MONITORING A BOOT PROCESS OF A DATA PROCESSING SYSTEM PROVIDING BOOT DATA AND USER PROMPT

(75) Inventors: Maximino Aguilar; Norbert Blam, both of Austin, TX (US); Mark Earl Plunkett; Raymond Francis Romon, both of Oronoco, MN (US); James Michael Stafford, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/397,608

(22) Filed: Sep. 16, 1999

(51) Int. Cl.[7] .......................... G06F 9/00; G06F 15/177
(52) U.S. Cl. ........................................ 713/2; 713/100
(58) Field of Search ..................................... 713/2, 100

(56) References Cited

U.S. PATENT DOCUMENTS

| | | | | |
|---|---|---|---|---|
| 5,948,101 A | * | 9/1999 | David et al. | 713/2 |
| 5,974,546 A | * | 10/1999 | Anderson | 713/2 |
| 6,049,871 A | * | 4/2000 | Silen et al. | 713/2 |
| 6,178,503 B1 | * | 1/2001 | Madden et al. | 710/8 |
| 6,272,626 B1 | * | 8/2001 | Cobbet | 713/2 |
| 6,272,627 B1 | * | 8/2001 | Mann | 713/2 |

* cited by examiner

Primary Examiner—Thomas Lee
Assistant Examiner—James Trujillo
(74) Attorney, Agent, or Firm—Andrew J. Dillon

(57) ABSTRACT

A method and system for monitoring the boot process of a data processing system. In accordance with the method and system of the present invention, data detailing each operation performed during a boot process of a data processing system is stored within a memory of the data processing system. All the stored data is then displayed in response to a halting of the boot process, such that step-by-step details of the boot process are available to a user prior to operation of the data processing system by an operating system.

14 Claims, 5 Drawing Sheets

```
                    ┌─30
        DISPLAY BOOT LOG           1 of 2

Network Station 8364
    Boot version . . . . . . . . . . . . . H205
    Video memory in megabytes . . 4
    Keyboard language . . . . . . . . Eng(US)
32  Mouse did not respond
    Memory in megabytes . . . . . . 128 — 33
                    •
                    •
                    •

35  Enter = Continue      36  F12 = Resume
37  F9 = Restart
```

*Fig. 4a*

```
                    ┌─34
        DISPLAY BOOT LOG           2 of 2

Attempting to use DHCP
    Waiting 4 seconds for a server to respond
    DHCP offer from server 9.3.247.97
    Found a successful DHCP server 9.3.247.97
38  Successfully connected with boot
    file server
                    •
                    •
                    •

35  Enter = Continue      36  F12 = Resume
37  F9 = Restart
```

*Fig. 4b*

METHOD AND SYSTEM FOR MONITORING A BOOT PROCESS OF A DATA PROCESSING SYSTEM PROVIDING BOOT DATA AND USER PROMPT

BACKGROUND OF THE INVENTION

1. Technical Field

The present invention relates in general to a method and system for data processing and, in particular, to a method and system for monitoring the boot process of a data processing system. Still more particularly, the present invention relates to a method and system for storing step-by-step data detailing of all operations performed during the boot process, such that the data may be obtained in response to a halting of the boot process.

2. Description of the Related Art

A typical data processing system, for example a general-purpose computer, consists of a central processing unit (CPU), memory components, and a number of device controllers that are typically connected through a system of buses that provides access to all shared memory. Each device controller is devoted to control of a specific type of device (e.g. disk drives, audio devices, and video displays). The CPU and device controllers can execute concurrently, competing for memory cycles. To ensure orderly access to the shared memory, a memory controller is typically provided whose function is to synchronize access to the memory.

For a computer to start running, for instance upon power up or reboot, an initial program is necessary. This initial program, or bootstrap program, is typically simple. Preferably, the bootstrap program initializes aspects of the data processing system, from CPU registers to device controllers to memory contents. The bootstrap program must know how to load an operating system and to start execution of the operating system. To load the operating system, the bootstrap program typically locates an operating system kernel, loaded into memory, and jumps to an initial address provided by the operating system kernel. Typically, the operating system is loaded into random-access memory (RAM) within the data processing system. Once loaded and initialized, the operating system controls the execution of programs and may provide services such as resource allocation, scheduling, input/output control, and data management. The operating system also determines the graphical user interface (GUI) provided for displaying data.

In most data processing systems, the bootstrap program is stored in two places. First, part of the bootstrap program may be stored in read-only memory (ROM). ROM is an ideal memory location because the ROM does not require initialization and is always available. However, the part of the bootstrap program stored in ROM is not configurable. Therefore, the configurable aspects of the bootstrap program are preferably stored at a fixed memory location available to the data processing system. The ROM contains instructions to access the part of the bootstrap program stored at a fixed memory location and loads the data into main memory. The location of an operating system kernel is preferably a configurable aspect of the bootstrap program whereby a data processing system is not limited to storage of operating system software at a fixed location.

While the bootstrap program is running, i.e. the data processing system is booting, it is typical for messages to be displayed describing the process being performed. For example, successful initialization of device drivers may be indicated by a message or several messages. Most typically, these messages scroll across the screen as each new message is displayed, whereby messages are often scrolled off the screen as the display fills up. By one method, the user may enter a special key sequence to halt the boot process. Only those messages being displayed when the process is halted may be viewed. Any past messages already scrolled from the screen are lost. Unfortunately, the user may not resume the boot process from this point and must reboot the system.

There are many cases in which access to each step taken by the boot process, while in progress, would be helpful to a user and/or server providing an operating system. For example, in the case of a failure which halts the boot process, accessing each part of the process and determining the success thereof may aid in debugging the boot process. Further, for a system administrator wanting to view the bootstrap program configuration for a particular machine, viewing the process taken during booting would be of importance.

By current methods, a process for accessing all process steps of a boot process is unavailable. Therefore, it would be desirable to provide a technique for viewing all process steps of a boot process before the operating system takes control. Further, it would be desirable to provide for halting the boot process in order to view the process steps, such that the boot process may be resumed thereafter without rebooting.

SUMMARY OF THE INVENTION

In view of the foregoing, it is therefore an object of the present invention to provide an improved method and system for data processing.

It is another object of the present invention to provide an improved method and system for monitoring the boot process of a data processing system.

It is further an object of the present invention to provide an improved method and system for storing step-by-step data detailing of all operations performed during the boot process of a data processing system, such that data may be obtained in response to a halting of the boot process.

In accordance with the method and system of the present invention, data detailing each operation performed during a boot process of a data processing system is stored within a memory of the data processing system. All the stored data is then displayed in response to a halting of the boot process, such that step-by-step details of the boot process are available to a user prior to operation of the data processing system by an operating system.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 4a–4b illustrates a pictorial illustration of a boot log displayed upon the halting of a boot process depicted in FIG. 3 according to the method and system of the present invention.

DESCRIPTION OF A PREFERRED EMBODIMENT

The present invention may be executed in a variety of computers under a number of different bootstrap programs and operating systems. The computer may be, for example, a personal computer, a midrange computer, a network computer or a mainframe computer. In addition, the computer may be a stand-alone system or part of a network such as a local-area network (LAN) or a wide-area network (WAN). For the purposes of illustration, a preferred embodiment of the present invention, as described below, is implemented on a network computer, such as the IBM Network Station manufactured by International Business Machines Corporation. In particular, network computers typically perform part of the booting process over a network, as will be further described.

Figure 1:
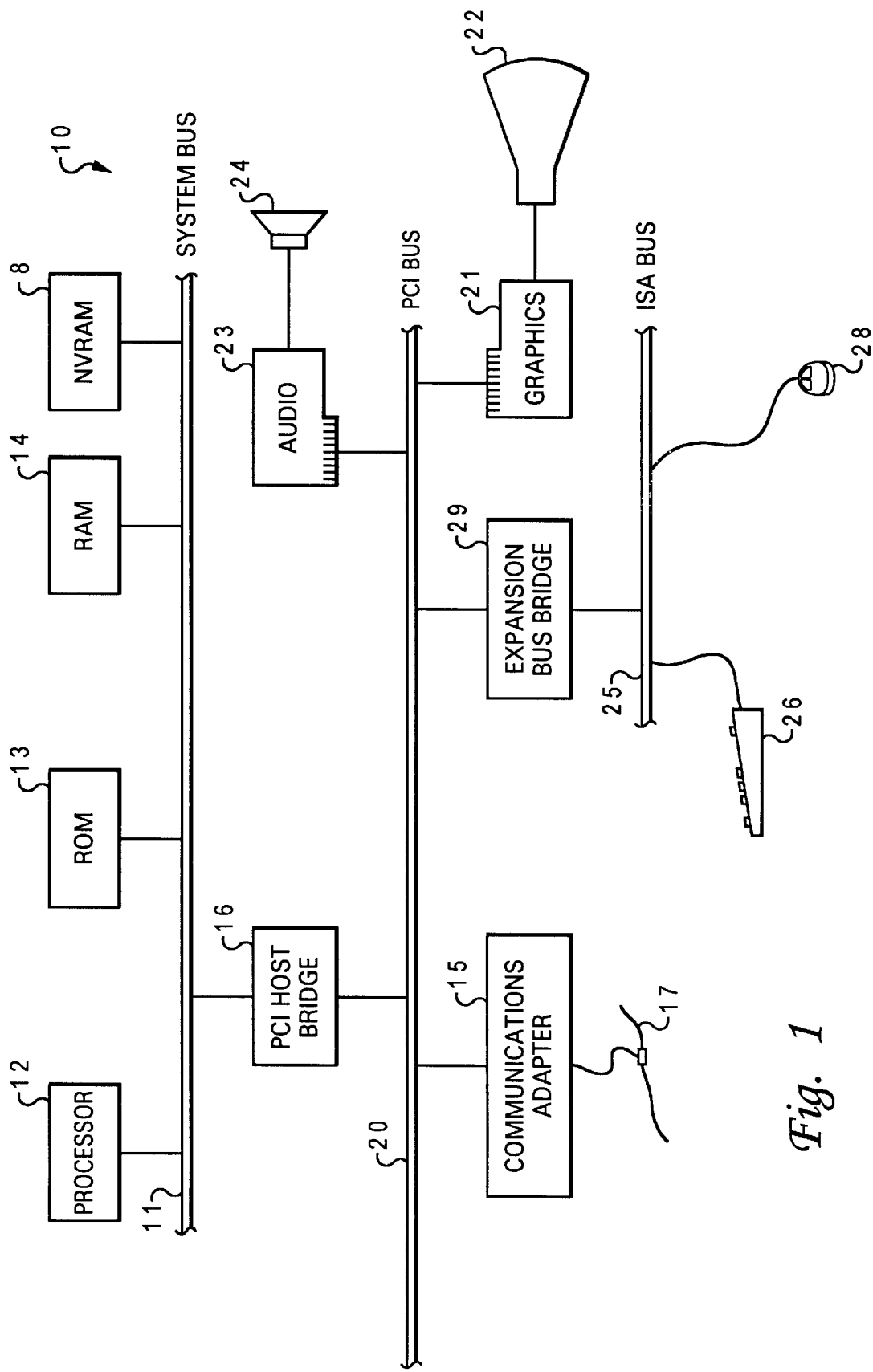
FIG. 1 depicts a block diagram of a typical computer system that may utilize a preferred embodiment of the present invention.

Referring now to the drawings and in particular to FIG. 1, there is depicted a block diagram of a typical network computer system that may utilize a preferred embodiment of the present invention. As shown, a central processing unit (CPU) 12, a read-only memory (ROM) 13, a Random-Access Memory (RAM) 14 and a non-volatile RAM (NVRAM) 8 are connected to a system bus 11 of a network computer system 10. CPU 12, ROM 13, RAM 14 and NVRAM 8 are also coupled to a peripheral component interface (PCI) local bus 20 of network computer system 10 through a PCI host bridge 16. PCI host bridge 16 provides a low latency path through which processor 12 may directly access PCI devices mapped anywhere within bus memory and/or input/output (I/O) address spaces. PCI host bridge 16 also provides a high bandwidth path for allowing PCI devices to directly access RAM 14.

Also attaching to PCI local bus 20 are communications interface 15 and expansion bus bridge 45. Communications interface 15 is for connecting network computer system 10 to a network 17. Expansion bus bridge 45, such as a PCI-to-industry standard architecture(ISA) bus bridge, may be utilized for coupling ISA bus 25 to PCI local bus 20. As shown, a keyboard 26 and a mouse 28 are attached to ISA bus 25 for performing certain basic I/O functions. In addition, an audio adapter 23 is attached to PCI local bus 20 for controlling audio output through speaker 24. A graphics adapter 21 is also attached to PCI local bus 20 for controlling visual output through display monitor 22.

A boot process for network computer system 10 typically includes executing a bootstrap program which performs system initialization and loads an operating system by locating and implementing an operating system kernel from a server within network 17. Utilizing the operating system kernel as a locating device, the bootstrap program loads the operating system, preferably into RAM 14, and initializes operation thereby.

Preferably, the bootstrap program is stored within ROM 13 and/or NVRAM 8. Further portions of the bootstrap program may also be stored in any other suitable machine-readable media such as RAM 14 and other disk and/or tape drive (e.g. magnetic diskette, magnetic tape, CD-ROM, optical disk, or other suitable storage media). While ROM 13 contains static boot programs, NVRAM 8 preferably contains configurable settings for the boot program to utilize. For example, stored in NVRAM 8 is preferably the location of the desired operating system kernel, which may be reconfigured. Any suitable machine-readable media may retain the operating system kernel and associated operating system (OS), such as RAM 14, ROM 13, and other disk and/or tape drive(e.g. magnetic diskette, magnetic tape, CD-ROM, optical disk, or other suitable storage media). Further, as previously described, network computer system 10 may access the operating system kernel and associated operating system from other machine-readable media accessible on network 17. Any suitable OS may direct CPU 12. For example, the AIX operating system is one of IBM's operating systems which is implemented.

During the boot process of network computer system 10, prior to the operating system taking over, a description of each step taken in the boot process is preferably recorded into RAM 14. By the method of the present invention, the bootstrap program may be halted prior to the operating system taking over, whereby display of each recorded step in RAM 14 is provided through display monitor 22 within a boot log menu. From the boot log menu, the booting process may be resumed or restarted.

Figure 2A:
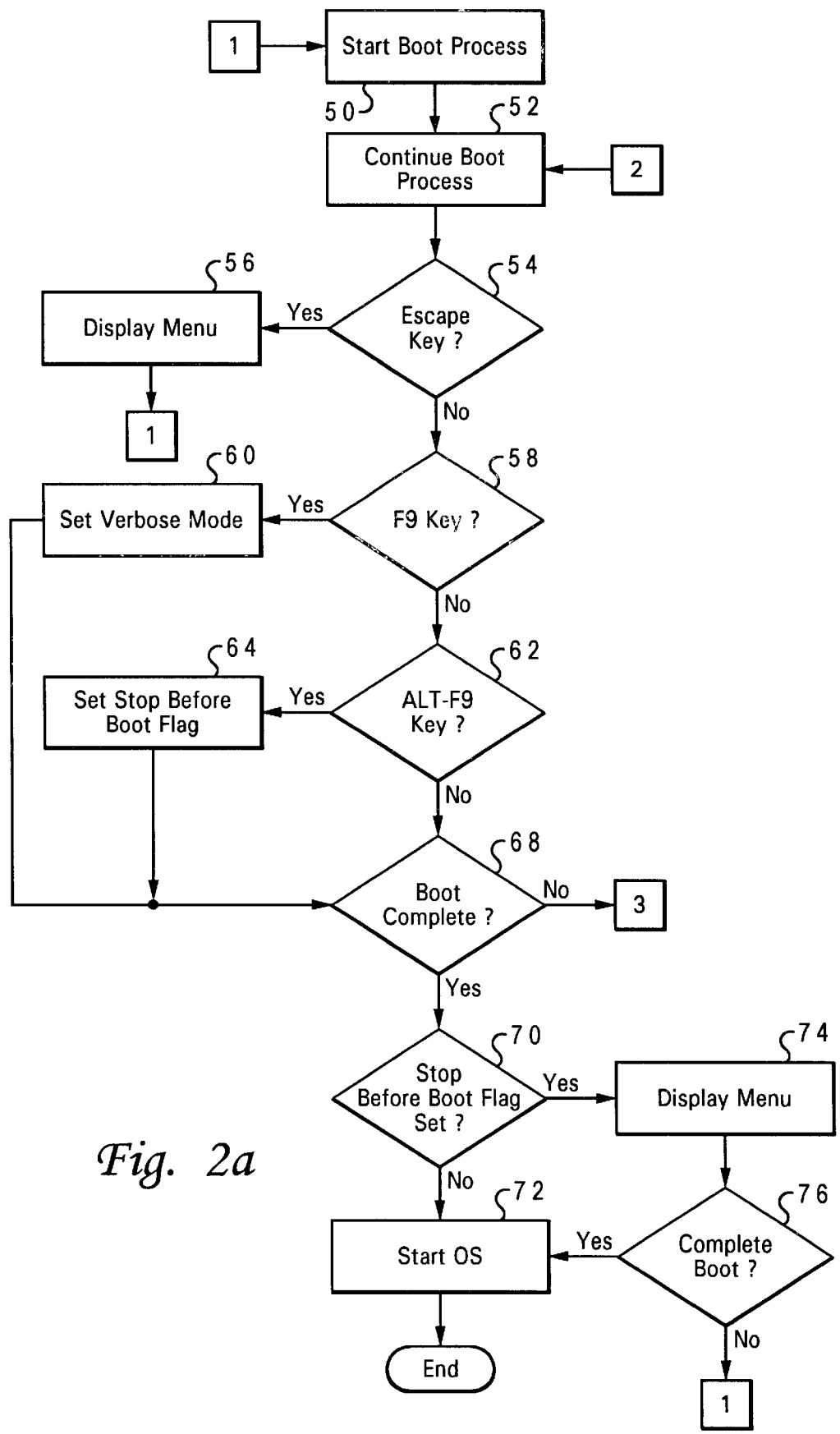
FIGS. 2a–2b illustrates a high-level logic flowchart of a booting process which is easily monitored according to the method and system of the present invention.
Figure 2B:
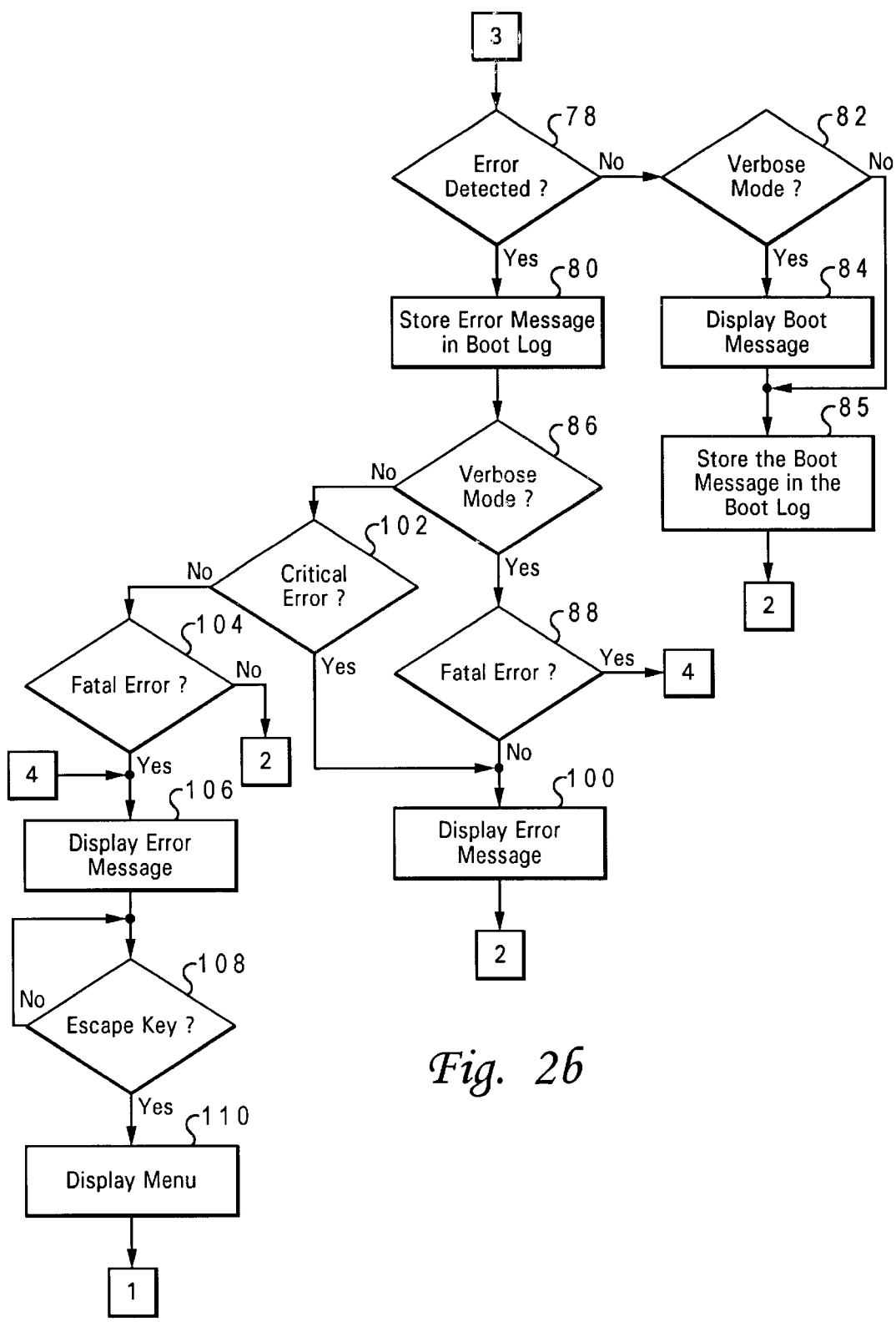

Referring now to FIGS. 2a–2b, there is illustrated a high-level logic flowcshart of a booting process which is easily monitored according to the method and system of the present invention. As depicted, the boot process starts at block 50 and thereafter proceeds to block 52. Block 52 illustrates continuing the boot process. Next, block 54 depicts a determination as to whether or not an escape key has been entered. If an escape key has been entered, a boot log menu is displayed, as depicted at block 56. Thereafter, the process returns to block 50.

At block 54, if an escape key has not been entered, the process passes to block 58. Block 58 illustrates a determination as to whether or not the F9 key has been entered. If the F9 key has been entered, the verbose mode is set, as depicted at block 60. Thereafter, the process passes to block 68. If the verbose mode is disabled when F9 is entered, then the verbose mode is set to enabled. Conversely, if the verbose mode is enabled when F9 is entered, then the verbose mode is set to disabled. When the verbose mode is enabled, all boot and error messages are displayed as they occur. When the verbose mode is disabled, only critical and fatal errors messages are displayed. A critical error will not prevent the system from completing the boot process. A keyboard not detected is an example of a critical error. A fatal error, however, is an error that will prevent the system from completing the boot process.

At block 58, if the F9 key has not been entered, the process passes to block 62. Block 62 depicts a determination as to whether or not the ALT-F9 key sequence has been entered. If the ALT-F9 key sequence has not been entered, the process passes to block 68. If the ALT-F9 key sequence has been entered, the stop before boot flag is set, as illustrated at block 64. Thereafter, the process passes to block 68.

Block 68 illustrates a determination as to whether or not the boot program is complete. If the boot program is complete, the process passes to block 70. Block 70 depicts a determination as to whether or not the stop before boot flag is set. If the stop before boot flag is not set, the OS is started, as illustrated at block 72. If the stop before boot flag is set, the menu is displayed as depicted at block 74. All error and boot messages can be displayed and scrolled through via the menu. In addition, the menu provides a selection option as to whether or not to complete the boot. Block 76 illustrates a determination as to whether or not boot completion is selected. If boot completion is selected, the OS is started, as depicted at block 72. If boot completion is not selected, the process passes to block 50.

Returning to block 68, if the boot program is not complete, the process passes to block 78 of FIG. 2b. Block 78 illustrates a determination as to whether or not an error has been detected during a step of the boot process. If an error is not detected for the process step, the process passes to block 82. Block 82 depicts a determination as to whether or not the verbose mode is enabled. If the verbose mode is enabled, a boot message is displayed for the step, as illustrated at block 84. Thereafter, the process passes to block 85. Otherwise, if the verbose mode is not enabled, the process passes to block 85. Block 85 depicts storing the boot message in the boot log, whereafter the process returns to block 52.

At block 78, if an error in a step is detected, an error message is stored in the boot log. Thereafter, block 86 illustrates a determination as to whether or not the verbose mode is enabled. If the verbose mode is enabled, the process passes to block 88. Block 88 depicts a determination as to whether the error is a fatal error. If the error is a fatal error, the process passes to block 106. If the error is not a fatal error, the error message is displayed, as illustrated at block 100. Thereafter the process returns to block 52.

At block 86, if the verbose mode is not enabled, the process passes to block 102. Block 102 illustrates a determination as to whether or not the error is a critical error. If the error is a critical error, the message is displayed, as depicted at block 100. If the error is not a critical error, the process passes to block 104. Block 104 illustrates a determination as to whether or not the error is a fatal error. If the error is not a fatal error, the process passes to block 52. If the error is a fatal error, the error message is displayed, as depicted at block 106. Thereafter, block 108 illustrates a determination as to whether or not an escape key has been entered. If the escape key is not entered, the process iterates at block 108. When the escape key is entered, the menu is displayed, as depicted at block 110. The menu displays a log of all boot and error messages that have been logged up to the point of the fatal error. Thereafter, the boot process is restarted at block 50.

While an escape key, F9 key, and ALT-F9 key sequence have been utilized to control decisions of the process, alternative keys and key sequences may be utilized in alternate. In addition, additional keys and key sequences may be defined within the process to perform additional functions and settings without departing from the spirit of the present invention.

Figure 3:
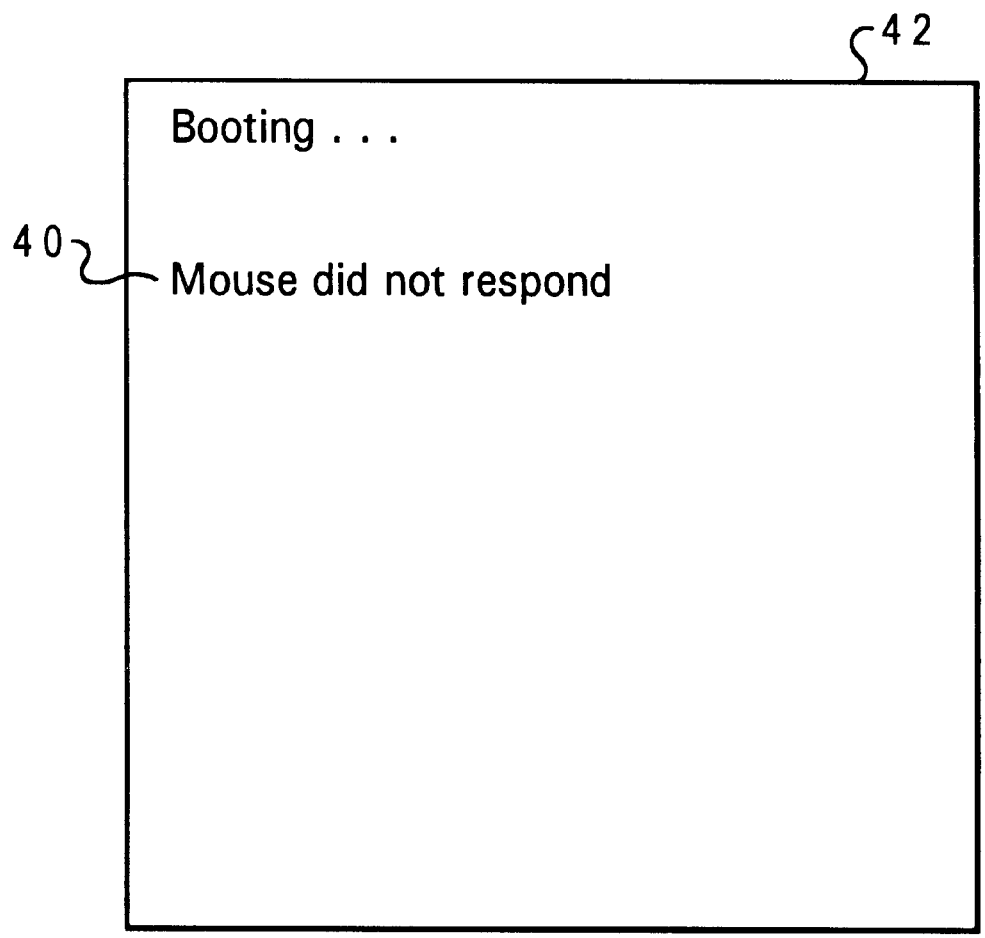
FIG. 3 depicts a pictorial illustration of a display window during the boot process while verbose mode is not enabled according to the method and system of the present invention.

With reference now to FIG. 3, there is depicted a pictorial illustration of a display window during the boot process while verbose mode is disabled according to the method and system of the present invention. During the process, the only error occurs when the mouse did not respond. Since this error is critical a description of the error is displayed as depicted at reference numeral 40 within display area 42.

Referring now to FIGS. 4a–4b there is illustrated a pictorial illustration of a boot log displayed upon the halting of a boot process depicted in FIG. 3 according to the method and system of the present invention. FIG. 4a depicts the first (1 of 2) boot log displays of the menu pages. FIG. 4b illustrates the second (2 of 2) boot log displays of the menu pages. Boot log display 30, depicted in FIG. 4a, includes a descriptive log 32 of each step of the same boot process utilized in FIG. 3. While in the verbose mode, only error messages could be displayed in the display area depicted in FIG. 3. However, descriptive log 32 includes an account of each step of the process. The descriptive element of "mouse did not respond" as depicted at reference numeral 33 is just one of the descriptive elements included in descriptive log 32.

A second boot log display 34, depicted in FIG. 4b can be advanced to by pressing the enter key, as indicated at reference numeral 35. Second boot log display 34 includes the remainder of the descriptive log 38 of process steps. From either boot log display 30 or 34, the booting process may be resumed by entering the F12 keystroke as indicated at reference numeral 36. Further, the boot process may be restarted by entering the F9 keystroke as indicated at reference numeral 37. In addition, in other embodiments of the present invention, alternate or additional function selections may be provided. Further, depending on the amount of boot and error messages for display, additional boot log displays may be utilized.

It is important to note that, although the present invention has been described in the context of a fully functional computer system, those skilled in the art will appreciate that the mechanisms of the present invention are capable of being distributed as a program product in variety of forms, and that the present invention applies equally regardless of the particular type of signal-bearing media utilized to actually carry out the distribution. Examples of signal-bearing media include, but are not limited to, recordable-type media such as floppy disks or CD ROMs and transmission-type media such as analogue or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for monitoring a boot process of a data processing system, said method comprising the steps of:

automatically storing data detailing each operations performed during a boot process of a data processing system within a memory of said data processing system;

in response to a user set signal, deferring a start of an operating system upon a completion of all operations in said boot process;

displaying all said stored data, wherein step-by-step details of said boot process are available to a user prior to operation of said data processing system by said operating system; and simultaneously prompting a user during display of said stored data whether to complete said boot process and execute said operating system based upon a configuration of data processing system indicated by said display of said stored data detailing said boot process.

2. The method according to claim 1, wherein said data processing system is a client computer on a network connected to a server, said method further comprising:

downloading said operating system from said server to said client computer upon an input from said client.

3. The method according to claim 1, wherein said step of prompting said user to load said operating system further comprises the step of:

graphically displaying an option for restarting said boot process from among a plurality of options selectable by a user.

4. The method according to claim 1, further comprising:

halting said boot process, in response to a failed step during said boot process.

5. The method according to claim 1, further comprising:
displaying said stored data in multiple pages which are advanced through.

6. The method according to claim 1, said method further comprising:
displaying messages describing each process step during said boot process.

7. The method according to claim 6, said displaying messages describing each process step during said boot process further comprising:
displaying only error messages describing critical and fatal errors during said boot process.

8. A system of monitoring a boot process of a data processing system, said system comprising:
means for automatically storing data detailing each operations performed during a boot process of a data processing system within a memory of said data processing system;
means for responding to a user set signal, deferring a start of an operating system upon a completion of all operations in said boot process;
means for displaying all said stored data, wherein step-by-step details of said boot process are available to a user prior to operation of said data processing system by said operating system; and
means for simultaneously prompting a user during display of said stored data whether to complete said boot process and execute said operating system based upon a configuration of data processing system indicated by said display of said stored data detailing said boot process.

9. The system according to claim 8, wherein said data processing system is a client computer on a network connected to a server, said system further comprising:
means for downloading said operating system from said server to said client computer upon an input from said client.

10. The system according to claim 8, wherein said means for prompting said user to load said operating system further comprises:
means for graphically displaying an option for restarting said boot process from among a plurality of option selectable by a user.

11. The system according to claim 8, further comprising:
means for halting said boot process, in response to a failed step during said boot process.

12. The system according to claim 8, further comprising:
means for displaying said stored data in multiple pages which are advanced through.

13. The system according to claim 8, said system further comprising:
means for displaying messages describing each process step during operation of said boot process.

14. The system according to claim 13, said means for displaying messages describing each process step during operation of said boot process further comprising:
means for displaying only error messages describing critical and fatal errors during said boot process.

* * * * *